United States Patent
Merriman

(10) Patent No.: US 7,338,703 B2
(45) Date of Patent: Mar. 4, 2008

(54) METALLIC-POLYMERIC COMPOSITE MATERIALS

(75) Inventor: Douglas J. Merriman, Wheeling, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 0 days.

(21) Appl. No.: 10/995,276

(22) Filed: Nov. 24, 2004

(65) Prior Publication Data
US 2006/0110588 A1    May 25, 2006

(51) Int. Cl.
*B32B 27/04* (2006.01)
*B32B 27/12* (2006.01)

(52) U.S. Cl. .............. 428/297.4; 428/105; 428/161; 428/172; 428/173; 428/188; 428/293.1; 428/300.7; 428/301.1; 428/301.4; 156/169; 156/173; 156/175; 156/185

(58) Field of Classification Search .............. 428/34.5, 428/36.3, 73, 105, 188, 156, 297.4, 161, 428/172, 173, 293.1, 300.7, 301.1, 301.4; 156/169, 173, 175, 185
See application file for complete search history.

(56) References Cited

U.S. PATENT DOCUMENTS

| | | | | |
|---|---|---|---|---|
| 3,993,818 A | * | 11/1976 | Novak et al. | 428/114 |
| 6,592,979 B1 | * | 7/2003 | Deteresa et al. | 428/293.4 |
| 6,655,633 B1 | * | 12/2003 | Chapman, Jr. | 244/123.9 |
| 2002/0125983 A1 | | 9/2002 | Hwang et al. | |
| 2002/0182397 A1 | * | 12/2002 | Whatley | 428/297.4 |
| 2003/0173460 A1 | * | 9/2003 | Chapman, Jr. | 244/123 |
| 2004/0131835 A1 | * | 7/2004 | Schmitt et al. | 428/293.1 |

* cited by examiner

*Primary Examiner*—Milton I. Cano
*Assistant Examiner*—David J. Joy
(74) *Attorney, Agent, or Firm*—Philip D. Lane

(57) ABSTRACT

Composites are provided having improved strength and rigidity, with respect to mass or volume, as compared to known polymeric composites or polymeric composites in combination with metal reinforcement. The composites of the present invention are metallic-polymeric composites and are comprised of polymeric composites and metallic composites. Such metallic-polymeric composites provide for composite parts having improved strength and/or rigidity, with respect to mass or volume, compared to other composite parts. The composite parts of the present invention have potential utility, for example, as aerospace craft leading edges, bodies, panels, and control surfaces.

12 Claims, 3 Drawing Sheets

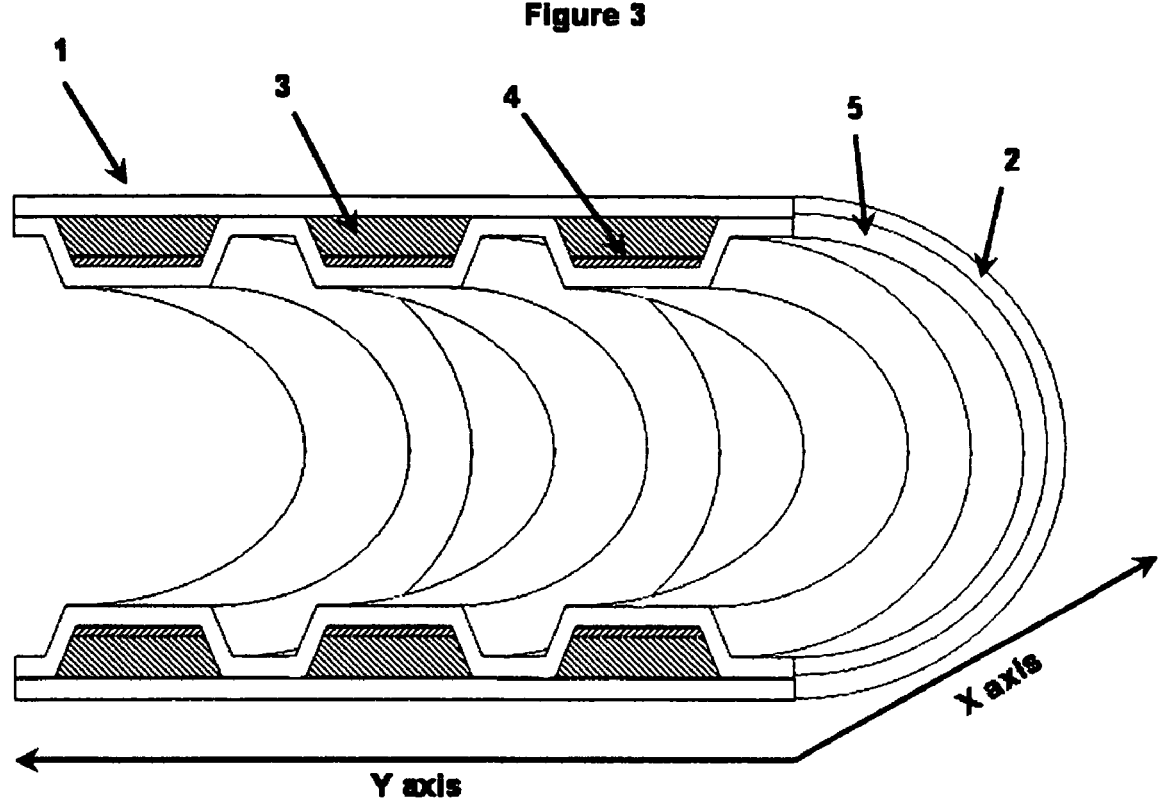

METALLIC-POLYMERIC COMPOSITE MATERIALS

FIELD OF THE INVENTION

This invention relates to composite materials and methods for preparing the same, more specifically to polymeric composite materials structurally reinforced with metallic composite materials.

BACKGROUND OF THE INVENTION

Generally, composite materials are prepared by imbedding a reinforcing material within a matrix material. A common example of a composite material is fiberglass. Fiberglass is glass fibers, which are the reinforcing material, embedded in a cured polymeric resin, which constitutes the matrix material.

The utility of any composite is typically related to its high strength or stiffness to weight or volume ratio and, sometimes, to its fatigue or corrosion resistance. Such beneficial properties of composites are typically a result of load sharing between the matrix materials and reinforcing materials. In most instances, these beneficial properties exceed those of the materials supplanted by the use of the composites.

Two general classes of composite materials are metallic composites and polymeric composites. Metallic composite utilize metal as the matrix material. Metallic composite are sometimes referred to as metal matrix composites. Suitable metals for use as the matrix may be alloys or pure metals. Metallic composites may utilize fibrous or particulate reinforcements. Fibrous reinforcements can be continuous or discontinuous with random or specific orientations. Such fibers may be comprised, for example, of ceramic materials such as aluminum oxide, silicon carbide, and carbon. Particulate reinforcements may be comprised of, for example, metals, ceramic materials such as metal oxides, carbides, nitrides, and borides, and intermetallic compounds.

As a result of their typically high strength to weight, or volume, ratios, metallic composites, particularly those comprised of low density metals such as aluminum and magnesium, have potential utility in numerous applications. However, metallic composites have been used in only a very limited number of applications and can typically very costly to manufacture.

Polymeric matrix composites utilize any of a number of different polymeric compounds as the matrix material. Such polymeric compounds can include thermoplastic and thermosetting plastics, resins, epoxies, and the like. Matrix materials can include fibers or particulates. Most commonly, high strength fibers, such as those of glass, aramid, or graphite, are used as the reinforcement material. When used in a composite, such fibers may be continuous, discontinuous, or utilized as a mat or cloth, and have a specific or non-specific orientation. A number of materials have been used as particulate reinforcements in polymeric composites. For example, glass, sand, and calcium carbonate particulates are commonly used as the reinforcement in polymeric particulate composites.

Polymeric composite materials have been found to have a high degree of utility when used as parts of structures, components, sub-assemblies, and the like, of assemblages such as aircraft, missiles, boats, medical equipment, and sporting goods. A polymeric composite commonly used in such applications is fiberglass. Other composites having particularly high degrees of utility in such applications are those that are prepared from carbon fibers combined with a polymeric matrix material such as thermosetting and/or thermoplastic polymeric resins. Such composites are referred to as carbon fiber composites, or more commonly, carbon composites. Carbon composites have been used, for example, in such diverse applications as aircraft flight surfaces, missile bodies, orthopedic supports, and golf club shafts.

Sometimes, it is determined that a polymeric composite part as originally envisioned or designed will not provide desired levels of strength and/or rigidity. In such instances, additional structural support may then be incorporated into the part. Such additional structural support may be provided by increasing the thickness of the polymeric composite part or by adding bracing, such as metal bracing or polymeric composite bracing, to the exterior of the part. Additionally, such bracing may be provided by embedding a metal structure or polymeric composite reinforcement structure into the polymeric composite part such that the reinforcement is essentially enclosed within the material of the polymeric composite part.

Such methods for providing additional structural support can substantially increase the strength and/or rigidity of the polymeric composite part. Unfortunately, such methods also can lead to a significant increase in the volume and/or mass of the resultant composite part. Increasing the thickness of the polymeric composite increases the mass and volume of the part. Flexural and overall strength of a composite part may be improved by the use of polymeric composite bracing, but such bracing can also result in significant increases in part volume and mass.

Generally, the use of metals as reinforcement structures, especially embedded reinforcement structures, can result in a significant increase in the composite part strength with a minimal increase of the composite part volume. The form of the metals used can include, but is not limited to, rods of square, rectangular, or circular cross-section, tubes, and flats. Unfortunately, such benefits are usually accompanied by a significant increase in the mass of the resultant composite part. For some demanding applications, such as aerospace applications, a significant increase in the volume and/or mass of the resultant composite part can limit, or even eliminate, the utility of the part.

Therefore, increasing the strength and/or rigidity of polymeric composite parts, without incurring a significant weight and/or volume penalty and that utilizes available constituents, would have utility in many applications.

SUMMARY OF THE INVENTION

Composites are provided that can have improved strength and rigidity, with respect to mass or volume, as compared to other polymeric composites or polymeric composites in combination with metal reinforcement. The composites of the present invention are metallic-polymeric composites and are comprised of polymeric composites in combination with metallic composites. Such metallic-polymeric composites can provide for composite parts having improved strength and rigidity, with respect to mass or volume, compared to other composite parts.

Methods are also provided for producing the metallic-polymeric composite of the present invention. One method entails incorporating a metal matrix composite with a polymeric matrix composite to form a resultant composite part. Such incorporation may be by embedding a metal matrix composite within a polymeric composite. Alternatively, the metal matrix composite may be attached to a surface of the polymeric composite material. A suitable metal matrix composite for use in the present invention is a continuous fiber reinforced aluminum tape. Other suitable metal matrix composites can be continuous or non-continuous fiber reinforced, or particulate reinforced, metal matrix composites of any suitable shape including wires, sheets, solid bars of any cross sectional geometry such as square, rectangular, triangular or polygonal, and hollow bars including square and round tubes. Different metal matrix composites may be utilized in the invention individually or in combination.

In the practice of these methods, a metal matrix composite may be embedded within a polymeric composite during formation of a composite part to effect incorporation and result in the production of a metal-polymeric composite part. Alternatively, one or more pieces of a metal matrix composite may be inserted into one or more cavities within a polymeric composite part. An adhesive may then be used to bond the metal matrix composite within such cavities of the polymeric composite to effect incorporation and result in the production of a metalic-polymeric composite part. Additionally, a metal matrix composite may be affixed to a surface of a polymeric composite part to result in the production of a metallic-polymeric composite part. An adhesive may be used to bond the metal matrix composite to the surface of the polymeric composite to effect incorporation.

The composite parts of the present invention have potential utility, for example, as aerospace craft leading edges, bodies, panels, and control surfaces.

BRIEF DESCRIPTION OF THE FIGURES

FIG. 3 is a perspective view of yet another example of a metallic-polymeric composite in accordance with yet another embodiment of the invention.

DETAILED DESCRIPTION OF EMBODIMENTS OF THE INVENTION

Figure 1:
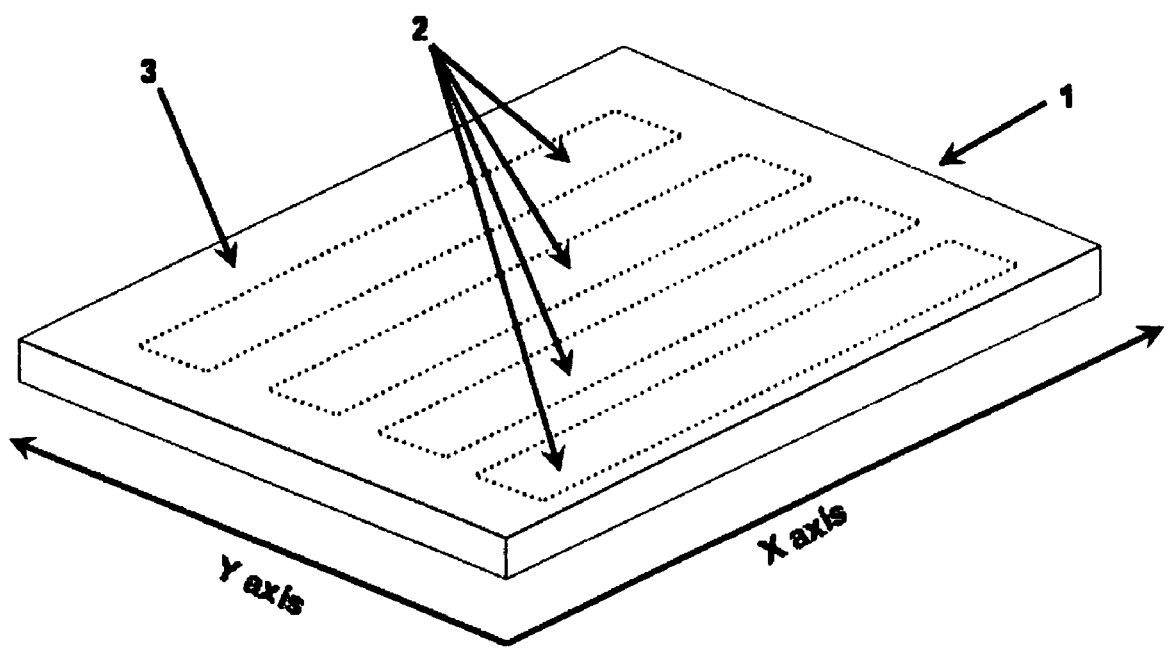
FIG. 1 is a perspective view of one example of a metallic-polymeric composite in accordance with an embodiment of the invention.

Composites are provided that can exhibit improved strength and rigidity, with respect to mass or volume, as compared to polymeric composites or polymeric composites in combination with metal reinforcement. The composites of the present invention are metallic-polymeric composites and are comprised of polymeric composites in combination with metallic composites. Such metallic-polymeric composites can provide for composite parts having improved strength and/or rigidity, with respect to mass or volume, compared to other composite parts. Composite parts prepared using the metallic-polymeric composite of the present invention have potential utility, for example, as aerospace craft leading edges, bodies, panels, and control surfaces.

The metallic composite of the present invention may be any metallic composite. Reinforcing materials in such metallic composites are not particularly limited and may include, but are not limited to, continuous fibers, ordered discontinuous fibers, disordered discontinuous fibers, fibrous mats and cloths, and particulates. The composition of such reinforcing materials can include, for example, aluminum oxide, basalt, carbides, nitrides, borides, glass, carbon, other metals, and intermetallic compounds. The matrix metal of the metallic composite may be any of those known in the associated arts. It is generally preferable, however, that the matrix metal be relatively light and strong. The use of light, strong, metals as the matrix metal of the metallic composite is generally preferable as metallic composites of such metals can exhibit very high strength to mass ratios. Such light, strong metals can provide for an accentuation of the beneficial aspects of the present invention, particularly strength and stiffness, with respect to the weight and volume of a resultant composite part. Examples of such light, strong metals include, but are not limited to, aluminum, magnesium, and alloys thereof.

Highly useful forms of such metallic composites for use in the present invention are tapes, wires, or other relatively thin, elongated, geometric shapes. This is not to say, however, that such geometric shapes are the only shapes useful in the practice of the present invention. Other geometric shapes may be utilized to advantage, depending on the configuration and desired properties of a metallic-polymeric composite part of the present invention. For example, such suitable shapes can include, but are not limited to, wires, sheets, solid bars of any cross sectional geometry such as square, U-shaped, rectangular, triangular or polygonal, and hollow bars including square and round tubes.

Particularly advantageous metallic composites for use in the present invention are continuous fiber composites having aluminum, magnesium, or an alloy thereof, as the matrix metal. A particularly suitable metal matrix composite for use in the present invention is a continuous fiber reinforced aluminum tape. wherein the continuous fiber reinforcement of this tape extends parallel to the tape length.

Suitable continuous fiber reinforcement tape may include METPREG™ composite tapes (Touchstone Research Laboratory, Ltd., R.D. 1, Box 100 B, Triadelphia, W. Va. 26059). METPREG™ these tapes include a continuous fiber reinforced aluminum tape. The continuous fibers in this tape are orientated parallel to the length of the tape. The tensile and compressive strengths of this tape are greater than values provided by conventional aluminum alloys. Additionally, the modulus of elasticity of this tape is approximately equivalent to that of steel. The tape is commercially available as continuous strips having widths of 0.25 to 1.5 inches and thicknesses of 0.010 to 0.025 inches.

Other suitable metal matrix composites can be continuous or non-continuous fiber reinforced, or particulate reinforced, metal matrix composite. Two or more metal matrix composites that differ in form or composition may be utilized simultaneously in the metallic-polymeric composite of the present invention.

The polymeric composite of the present invention may be any of those known polymeric composites. The polymeric matrix of such composites may be comprised of any material known to be suitable as a polymeric matrix material. Such materials can include, but are not limited to, thermoplastic and thermosetting plastics, resins, epoxies, esters, imides, and the like. The reinforcing material of such polymeric composite may be any of those known in the associated arts including, but not limited to, continuous fibers, ordered discontinuous fibers, disordered discontinuous fibers, fibrous mats, cloths, and particulates. Particularly useful polymeric composites for the practice of the present invention are carbon fiber composites and glass fiber composites, including fiberglass.

The metallic composite may be embedded in the polymeric composite or fixed to a surface of a polymeric composite to provide the metallic-polymeric composite of the present invention. Embedding of the metallic composite within the polymeric composite may be performed during forming of the polymeric composite. Alternatively, the metallic composite may be embedded in cavities provided in an already formed polymeric composite.

For example, one or more strips, bars, plates, wires, and/or tapes of metallic composite may be placed between one or more successive layers of the carbon cloth during lay-up of a carbon fiber cloth composite. Preferably, the metallic composite is thoroughly wetted by the polymer used to infiltrate the carbon cloth. Additionally, it is preferable that the polymer used to infiltrate the carbon cloth, once cured, strongly bonds to the metallic composite. Subsequent curing of the polymer results in the production of a polymeric composite having an embedded metallic composite, which is the metallic-polymeric composite of the present invention.

Alternatively, for example, one or more pieces of metallic composite may be placed in a mold, or tool, used for forming a composite part. The metallic composite piece(s) are then embedded within polymeric composite forming material when such composite forming material is introduced onto the mold, or tool. Subsequent curing of the polymer results in the production of a polymeric composite having an embedded metallic composite, which is the metallic-polymeric composite of the present invention. Here again, it is preferable that the polymer of the polymeric composite forming material, once cured, strongly bonds to the embedded metallic composite.

Another example of a potential method for embedding a metallic composite within a polymeric composite, to provide a metallic-polymeric composite of the present invention, does not require the forming of the polymeric composite around the metallic composite. In this method, the polymeric composite has interior holes or chambers into which a piece(s) of metallic composite may be inserted or otherwise placed. Prior to placement, the metallic composite may be coated with an adhesive. Alternatively, an adhesive may be introduced into the hole or cavity prior to or after placement of the metallic composite piece. The adhesive, once cured, affixes the metallic composite to the polymeric composite to provide a metallic-polymeric composite of the present invention.

Although it usually preferred to embed metallic composites within a polymeric matrix, such metallic composites may also be affixed to an outer surface of polymeric composites to provide the metallic-polymeric composites of the present invention. Such attachment is typically best achieved by use of an adhesive. Alternatively, the metallic composite may be affixed to the surface of the polymeric composite by mechanical means, such as with screws, pins, rivets, and the like. In almost all instances such mechanical attachment may be considered inferior to adhesive attachment. Such expected inferiority is based on the fact that a limited number of points of attachment, as provided by mechanical means, will in almost all instances be inferior, with respect to the strength and rigidity imparted to the resultant metallic-polymeric composite, to the essentially infinite number of attachments points provided by adhesive attachment.

It should be noted that it is generally important that the metallic composite portion of the metallic-polymeric composite be firmly attached to the polymeric portion. Such attachment may require that the polymeric material of the metallic-polymeric composite form a strong bond with the metallic composite. Alternatively, an adhesive that strongly bonds to both the metallic and polymeric composite may be utilized. In those cases where the metallic composite is mechanically attached to the polymeric material of the metallic-polymeric composite it is desired that such attachment be strong and not provide for any significant flexing of the metallic composite. Typically, such mechanical attachment will require numerous attachment points. If desired, the surface of the metallic composite may be roughened prior to incorporation into the metallic-polymeric composite to provide for improved polymer or adhesive bonding. The metallic composite may also be designed such that it exhibits a large surface area for polymer or adhesive bonding. The metallic composite design may also encompass any of a number of different mechanical attachment points.

It is very important that the design of a metallic-polymeric composite part be well considered so as to gain the full benefit of incorporating a metallic composite with a polymeric composite to provide the present invention. Preferred designs are such that significant stresses imposed on the metallic-polymeric composite part are principally directed through and to the metallic composite portion of that composite. That is, metallic-polymeric composite parts are preferably designed such that the most significant forces such parts will be subjected to are principally carried by the metallic composite portion of the part. The importance of such design aspects may not be immediately recognized. Therefore, some specific design aspects will be considered in the following discussion.

First, it should be appreciated that the orientation of the metallic composite portion of a metallic-polymeric composite part can significantly affect the resultant strength and rigidity of that part. Consider a flat panel of metallic-polymeric composite lying in a x-y plane. A three dimensional representation of such a panel is illustrated in FIG. 1. The metallic-polymeric composite (1) is comprised of continuous fiber reinforced aluminum tapes (2) embedded in a carbon-carbon composite (3). The fiber reinforced aluminum tapes do not over-lap each other. The principal plane of the tapes is parallel to the x-y plane of the composite. Additionally, the long axis of each tape is mutually parallel to that same axis of any other tapes present in the composite and to the x axis of the x-y plane in which the flat panel of metallic-polymeric composite lies. With the application of a suitable force along the y axis, such a panel will be found to flex out of plane. It will found, however, that application of a very much greater force along the x axis is required to flex the panel out of plane. This result is due to the ability of the embedded metallic composite tape, with its inherently high flexural modulus along its length, to significantly resist out of plane deflection. This property is imparted to the composite tape as a result of the continuous fiber reinforcement along the length of the tape. The magnitude of this resistance is also related, among other things, to the length of the metallic composite tape embedded in the metallic-polymeric composite. Typically, longer lengths of tape impart greater strength to the composite than do shorter lengths. It is generally not useful to have unsupported sections of metallic composite extending out of a metallic-polymeric composite. Similarly, it is generally also not beneficial to have unsecured portions of a metallic composite otherwise affixed to the surface of a metallic-polymeric composite.

Figure 2:
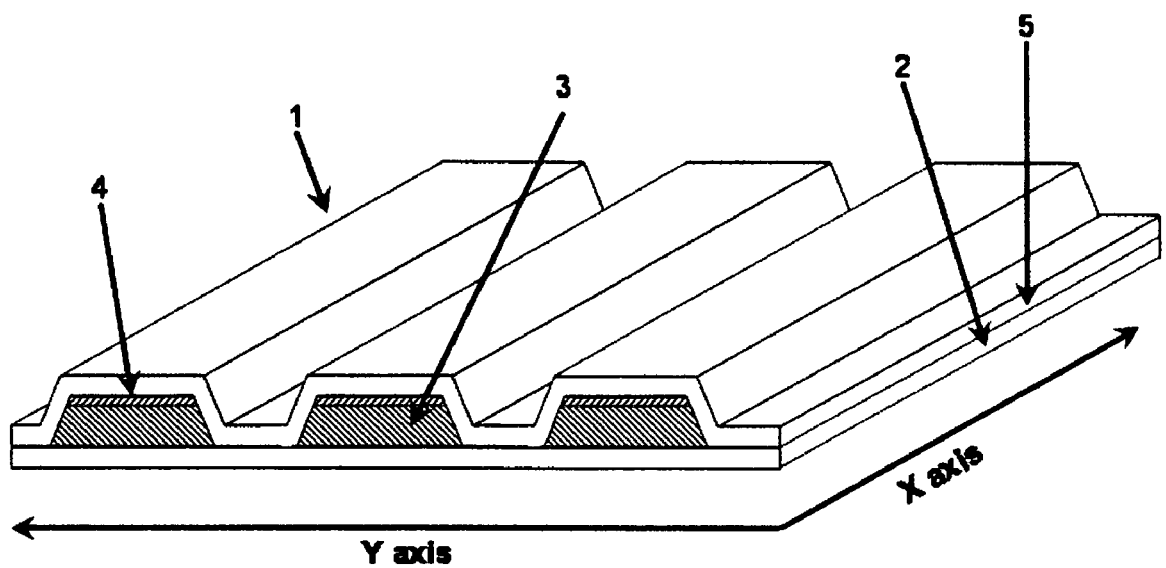
FIG. 2 is a perspective view of another example of a metallic-polymeric composite in accordance with another embodiment of the invention.

Other design aspects can be incorporated into metallic-polymeric composite part. For example, FIG. 2 illustrates a three dimensional representation of a section of a larger metallic-polymeric composite part. The form of the illustrated section can be considered to extend for some length along the x axis and repeat some number of times along the y axis. This metallic-polymeric composite (1) consists of a layer of a polymeric composite (2), such as a carbon fiber composite, on to which is bonded structural foam (3). The structural foam has a trapezoidal cross-sectional shape and may be procured commercially. Suppliers of such structural foams include DIAB (315 Seahawk Drive, DeSoto Tex. 75115) under the trade name Divinycell® HT and Rohn GmbH & Co. KG (64275 Darmstadt, Germany) under the trade name Rohacell®. A length of metallic composite tape (4), particularly a continuous fiber reinforced aluminum metallic composite tape, is bonded to the entire top of each of the structural foam sections with a suitable adhesive. The entire assemblage is then covered with another second layer of polymeric composite (5), such as a carbon fiber composite. The polymer of the polymeric composite should strongly bond with both the metallic composite and the structural foam after curing. Although not shown in this illustration, sometimes the structural foam/metallic composite assemblages do not extend the entire length of the metallic-polymeric composite part along the x axis. Typically, the ends of the metallic composite/structural foam assemblage are covered with the second layer of polymeric composite during application of that layer. Such a metallic-polymeric composite part will exhibit strength and resistance to flexing out of the x-y plane when forces parallel to the y axis are applied to the part. However, such a metallic-polymeric composite part will exhibit significantly greater strength and resistance to flexing out of the x-y plane when forces parallel to the x axis are applied to the part. Such significantly greater strength and resistance to flexing is partially a result of the structural foam raising the metallic composite tape some distance above the primary plane of the polymeric composite. This raising of some distance increases the already significant flexural moment imparted to the metallic-polymeric composite part by use of the tape and results in a significant stiffening of the metallic-polymeric composite part along the x axis.

The design just presented is not necessarily limited to a primarily two dimensional composite part. The same materials as given just previously can also be incorporated into a metallic-polymeric composite part that significantly extends in the z axis direction. A three dimensional representation of such a part is illustrated in FIG. 3. This metallic-polymeric composite (1) consists of a layer of a polymeric composite (2), such as a carbon fiber composite, on to which is bonded structural foam (3). For this design, the layer of a polymeric composite (2) is not co-linear with the x axis. Instead, this layer is curved along the x axis and extends into z axis such that a cross section of the part in the x-z plane would approximate a semicircular shape. (Note that the z axis is considered to be orthogonal to both the x and y axes.) As with the previous design, a length of metallic composite tape (4), particularly a continuous fiber reinforced aluminum metallic composite tape, is bonded to the top of each of the structural foam sections with a suitable adhesive. The entire assemblage is then covered with another second layer of polymeric composite (5), such as a carbon fiber composite. The polymer of the polymeric composite should strongly bond with both the metallic composite and the structural foam after curing. After curing, the resultant metallic-polymeric composite part will be found to be extremely resistant to deformation from any forces directed along the x or z axes. The principles of the design of such a part may be especially suitable for incorporation into the design of pressurized vessels, storage tanks, and the leading edges of flight surfaces.

Another illustrative example will further demonstrate how metallic composites may be incorporated into part designs to result in the benefits of the metallic-polymeric composites of the present invention. Consider a hollow cylinder of a polymeric composite. A metallic composite tape is fixed to the outer surface of the cylinder such that the tape forms a spiral around the cylinder. Alternatively, the spiral wound metallic composite tape may be embedded within the walls of the cylinder. By either method, the metallic composite tape is incorporated with the polymeric composite to form a metallic-polymeric composite of the present invention. The resulting metallic-polymeric composite cylinder will have significant resistance to torsional stresses and compressive forces.

The above examples are not to be considered limiting and are only illustrative of a few of the many types of metallic-polymeric composites that may be prepared. The present invention may be varied in many ways without departing form the scope of the invention and is only limited by the following claims.

What is claimed is:

1. A metallic-polymeric composite comprising:
   a polymeric composite, wherein said polymeric composite comprises a reinforcing material embedded in a polymer matrix; and
   a metallic composite, wherein said metallic composite comprises a reinforcing material embedded in a metal matrix material, and wherein said metallic composite is embedded within said polymeric composite.

2. The composite of claim 1, wherein the reinforcing material of said metallic composite is selected from the group consisting of a continuous fiber, ordered discontinuous fiber, disordered discontinuous fiber, a fibrous mat, and a cloth.

3. The composite of claim 2, wherein the matrix material of said metallic composite is selected from the group consisting of aluminum and magnesium.

4. The composite of claim 3, wherein said metallic composite is a continuous fiber reinforced aluminum tape.

5. The composite of claim 3, wherein said metallic composite is a continuous fiber reinforced aluminum wire.

6. The composite of claim 1, wherein the reinforcing material of said polymeric composite is selected from the group consisting of a continuous fiber, ordered discontinuous fiber, disordered discontinuous fiber, a fibrous mat, and a cloth.

7. The composite of claim 6, wherein said polymeric composite is a carbon fiber composite.

8. A method of preparing a metallic-polymeric composite comprising the step of embedding a metallic composite within a polymeric composite, wherein said metallic composite comprises a reinforcing material embedded in a metal matrix material.

9. The method of claim 8, wherein said metallic composite is bonded to said polymeric composite by use of an adhesive.

10. The method of claim 9, wherein said adhesive is the uncured polymer of said polymeric composite.

11. The method of claim 8, wherein said metallic composite is an continuous fiber reinforced aluminum tape.

12. A method of preparing a metallic-polymeric composite comprising the steps of:
    embedding a metallic composite having a reinforcing material embedded in a metal matrix within a polymeric composite forming materials; and
    curing said polymeric composite forming materials, thereby providing said metallic-polymeric composite.

* * * * *